US005566839A

United States Patent [19]

Muller

[11] Patent Number: 5,566,839
[45] Date of Patent: Oct. 22, 1996

[54] STAND FOR HOLDING OBJECTS OF THE SAME SHAPE

[76] Inventor: Hans-Peter Muller, Eggweg 2, CH - 6315 Oberägeri, Switzerland

[21] Appl. No.: 336,676

[22] Filed: Nov. 7, 1994

RELATED U.S. APPLICATION DATA

[63] Continuation-in-part of PCT/CH94/00043, Mar. 1, 1994.

[30] Foreign Application Priority Data

Mar. 10, 1993 [CH] Switzerland .............................. 717/93

[51] Int. Cl.$^6$ ................................................... A47G 29/00
[52] U.S. Cl. ............................. 211/40; 211/163; 211/144; 211/188; 211/194
[58] Field of Search ................................. 211/40, 41, 163, 211/189, 144, 194, 188; 312/108, 264, 305, 9.1

[56] References Cited

U.S. PATENT DOCUMENTS

| | | | |
|---|---|---|---|
| 118,098 | 8/1871 | Boswell | 211/163 |
| 1,480,939 | 1/1924 | Hand | 211/41 |
| 1,832,801 | 11/1931 | Wright | 211/189 X |
| 2,526,246 | 10/1950 | Leeper | 211/188 X |
| 3,288,301 | 11/1966 | Kent et al. | 211/41 |
| 3,484,226 | 12/1969 | Golighty | 211/41 X |
| 5,185,982 | 2/1993 | Hostetler | 211/74 X |
| 5,188,240 | 2/1993 | Marino et al. | 211/41 |
| 5,385,397 | 1/1995 | Chow | 211/40 X |

FOREIGN PATENT DOCUMENTS

| | | | |
|---|---|---|---|
| 552193 | 11/1956 | Italy | 211/189 |
| 8304467 | 7/1985 | Netherlands | 312/108 |
| 2268051 | 1/1994 | United Kingdom | 211/189 |

Primary Examiner—Alvin C. Chin-Shue
Assistant Examiner—Brian J. Hamilla
Attorney, Agent, or Firm—Browdy and Neimark

[57] ABSTRACT

A stand for holding compact discs and/or tape cassettes preferably has a rotatably mounted part (1) made up of a multiplicity of bar-shaped elements (7, 8) of two different types. These elements have transverse grooves enabling them to be fitted one on the other in parallel pairs, with alternate pairs at right angles to each other, thus giving two pairs of parallel walls. The elements (7, 8) also have longitudinal ribs (9) located opposite each other in pairs, thus providing lateral supports for the objects. The individual components can be provided as a kit which enables the stand to be transported and distributed in unassembled form. A second, smaller, part (2), can be mounted on the first (1) and connected to it. This second part is designed to hold differently shaped objects, such as audio cassettes.

7 Claims, 2 Drawing Sheets

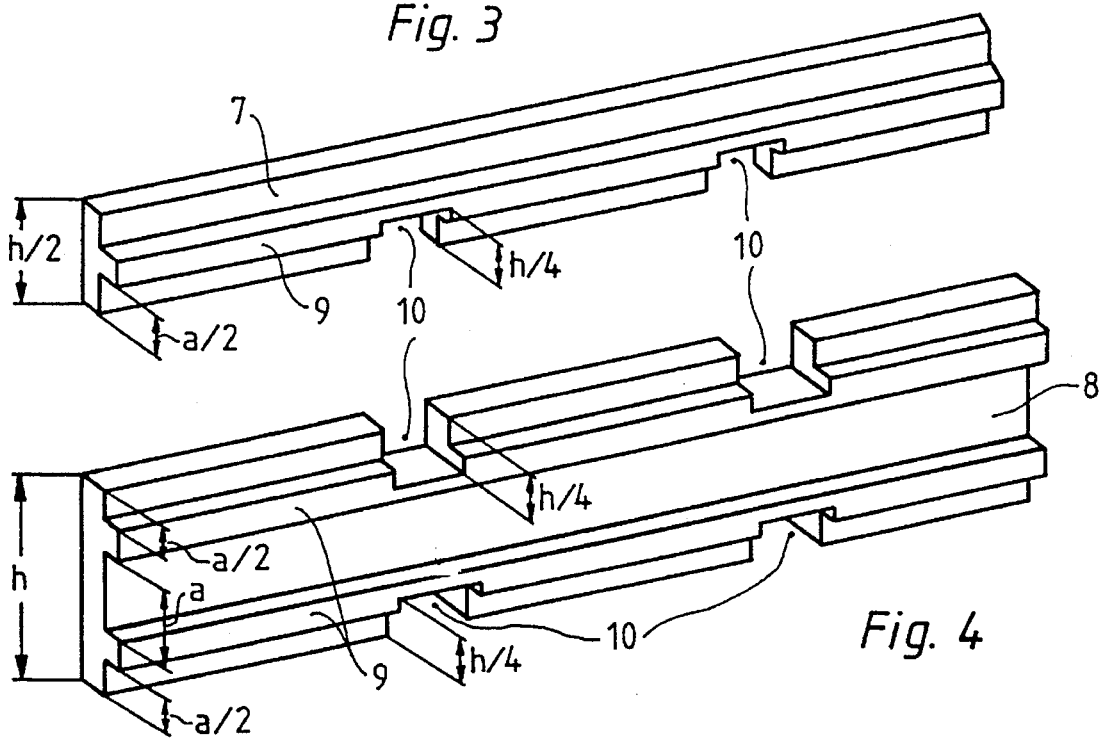
Fig. 3
Fig. 4
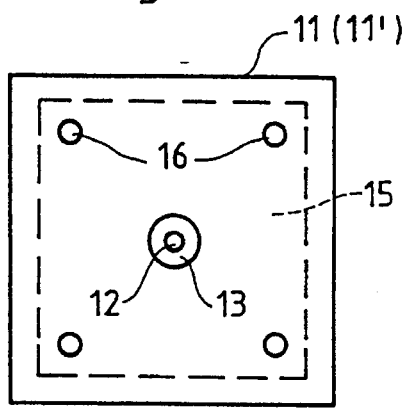
Fig. 6
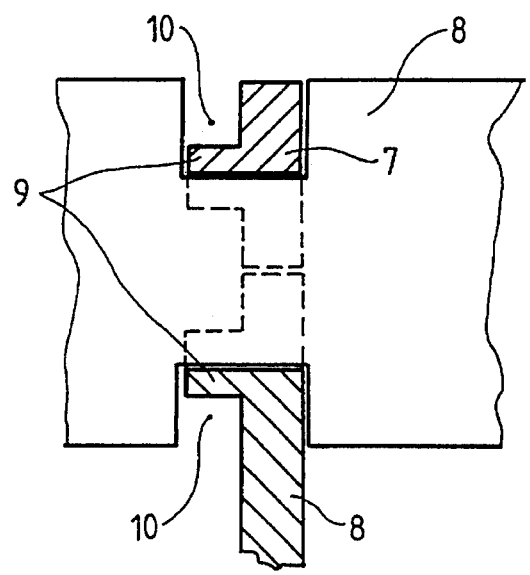
Fig. 5
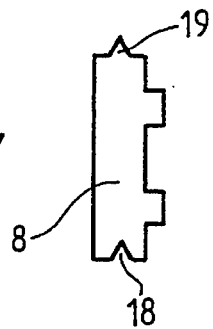
Fig. 7

5,566,839

STAND FOR HOLDING OBJECTS OF THE SAME SHAPE

FOREIGN PRIORITY

This is a CIP of parent copending application PCT/CH94/00043, filed Mar. 1, 1994, the contents of which are incorporated herein by reference.

FIELD OF INVENTION

The invention relates to a stand for holding objects of the same shape, in particular audio media such as compact discs or audio tape cassettes. The point of departure is at least one holding or receiving part, composed of stacked, identical structural elements. These elements form horizontal lateral guides, which are disposed around a vertical center axis, for the objects to be held. Such stands can be used both in the home and in retail stores, for instance, and the like.

BACKGROUND OF THE INVENTION

Various versions of devices or frames for holding and displaying such objects, especially compact discs in their cases, are known. Usually they are in "pillar" form and made of metal, and the cassettes are lined up in slots one above the other in an approximately horizontal position. If the number of object is rather large, however, such "pillars" become quite high; then only some of the objects are reachable at a convenient height, and problems of stability can arise.

A stand of this type is known from European Patent Disclosure EP-A 0 504 771. It allows four CDs to be held on each level, and substantially comprises U- or I-profile rails disposed crosswise to another and made of a slightly elastic material. The cassettes are inserted between the legs of the profile along two short sides abutting one another at right angles and are firmly clamped there. The user has to hold the rotatably mounted holding part firmly when inserting or removing the cassettes, or else it will inconveniently keep turning, out of the way. The main problem of this type of retention, however, is that the objects protrude from the holding part by one corner, and moreover there is no assurance that they will actually be held on two sides. Hence there is the constant danger that if the user is even only slightly careless—and even if the holding part is merely rotated—the objects will be pushed out or will fall out.

SUMMARY OF THE INVENTION

An object of the invention is therefore to provide a stand of this kind in such a way that it is easy and safe to use and that the aforementioned disadvantages are avoided. The objects to be held are stored only loosely, yet are still protected against falling out unintentionally. Other objects of the invention are a pleasing appearance and ease of manufacture and assembly.

The stand according to the invention that meets these demands is characterized in that to form the holding part, bar-shaped structural elements are provided which rest in pairs on one another, parallel and intersecting one another; at the intersection points they have transverse grooves and are interlocked in one another, and the two structural elements of each pair form supports, facing one another, for the objects to be held.

BRIEF DESCRIPTION OF THE DRAWING

An exemplary embodiment of the stand according to the invention is described in further detail below in conjunction with the drawing, wherein:

FIG. 3 a perspective view of one of the terminating bars that are used at the top and bottom;

FIG. 4 is a perspective view of one of the bars disposed in between the top and bottom terminating bars;

FIG. 5 is a broken away view, partly in section, showing the interengagement of the bars at their intersecting points;

FIG. 6 is a plan view of the top ending plate; and

FIG. 7 is an elevational view of a bar having a special cross section that stabilizes the mutual position.

DETAILED DESCRIPTION OF THE EMBODIMENT(s).

Figure 1:
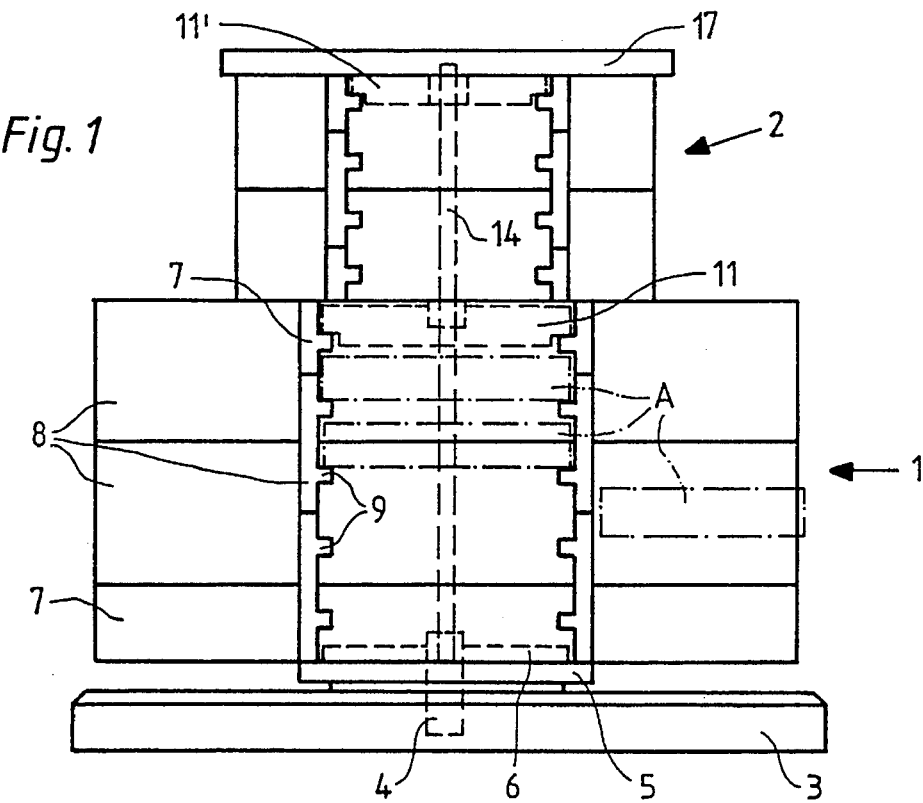
FIG. 1 is a front elevational view of the entire stand with the base plate on which it is rotatable.

The stand of FIG. 1, in this embodiment, is composed of a lower receiving and holding part 1 and a (smaller) receiving and holding part 2 disposed above it. Part 1 is intended especially to receive compact discs (A) in their cases (e.g. rectangular plastic boxes), while the upper part (2) serves to hold audio tape cassettes (e.g. music cassettes). However, it must be emphasized that the stand according to the invention can also comprises merely part 1 or part 2 alone, or more than two receiving parts, as needed.

The stand is rotatably disposed on a base plate 3; for rotatable connection, a shaft 4 (or a commercially available turntable or the like) of known design, and therefore not described in detail here, is shown schematically. This rotational connection extends into a preferably square bottom plate 5, which is essentially like the top ending plate 11 as shown in FIG. 6. The pivot shaft 4 coincides with the vertical geometrical center axis of the entire arrangement.

The actual stand, in this case first the part 1 on the bottom plate 5, is now mounted for rotation on the base plate 3. For centering the stand on the bottom plate 5, this plate 5, like the ending plate 11 of FIG. 6, has an edge that is of somewhat different depth than the square center region 6 of the square bottom plate 5. The center region is slightly smaller than the base and is centered thereon, forming an outer ledge; the outer ledge supports the bottom edges of the bars when the stand is assembled. The center region 6 has the dimensions of the square void that is left free in the middle of the stand by the bar-shaped structural elements of part 1 (and of part 2) that are to be described below. The lowermost structural elements rest laterally against the vertical edge of this center region and are centered in this way.

Figure 2:
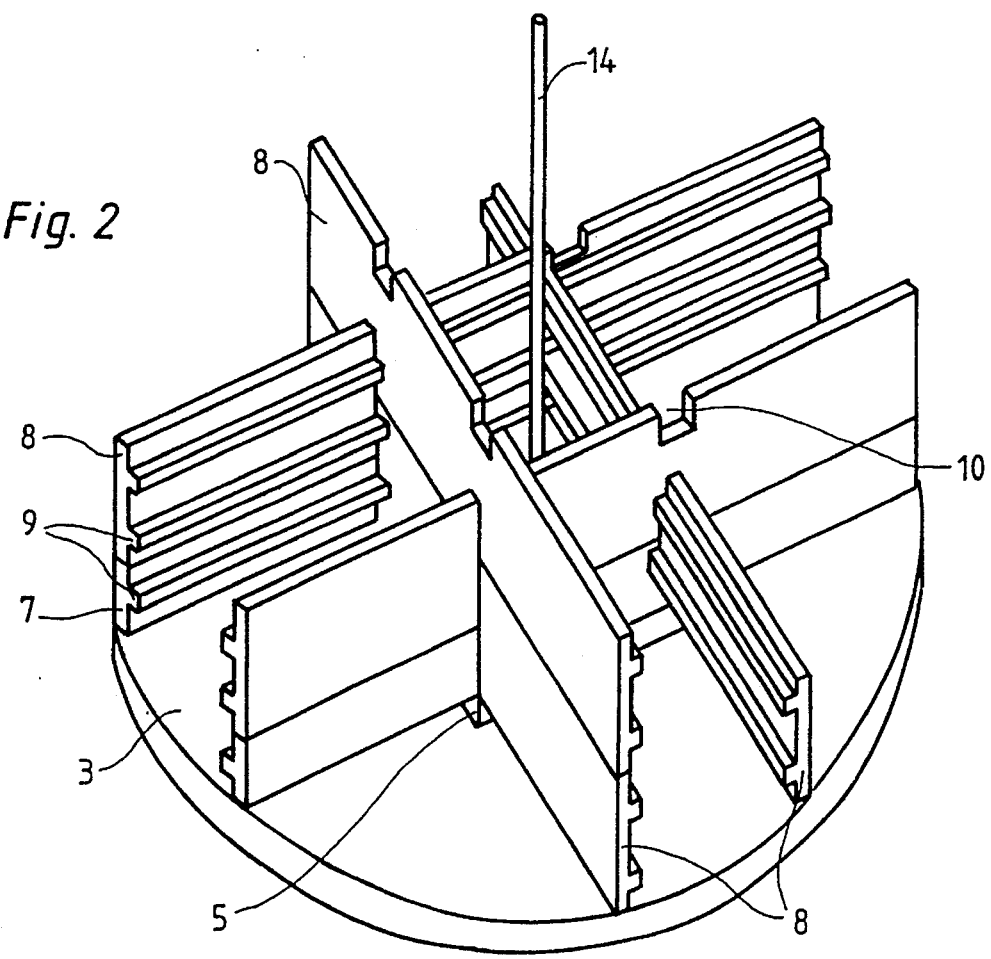
FIG. 2 is a perspective view of the lower part of the stand in the course of assembly.

As FIGS. 2, 3 and 4 show, the bar-shaped structural elements, hereinafter called bars, have different heights. Lower and upper ending bars 7 as shown in FIG. 3 are only half as high as the bars 8 of FIG. 4, and in the example shown here also have only one longitudinal rib 9, in contrast to the bars 8, which are provided with two such ribs. All the longitudinal ribs 9 are located on only one side of each respective bar; the opposite side is smooth. The longitudinal ribs 9 of a pair of bars face one another and form horizontal supports for two parallel side edges or regions of objects A to be received. Assembly begins by first placing two bars 7 parallel to one another in the aforementioned middle region 6. Then two bars 8 are mounted crosswise to these bars 7, as seen in FIG. 2. As FIGS. 3 and 4 show, all the bars 7, 8 have transverse grooves 10, into which the various transversely extending bars fit with their own, precisely identically extending transverse grooves. As can be seen in FIGS. 3 and 4, the bars 7 have one pair of transverse grooves 10, and the bars 8 have two pairs of identical transverse grooves 10. By placing the bars 8 on the bars 7 a stable base is created, which moreover is adequately centered by the middle region 6 of the base plate 5.

FIG. 5 shows how the stacked bars are interlocked at their intersecting points. From FIG. 5 one can see that the bar 8, part of which is shown in side view, receives a bar 7 in its upper transverse groove 10, while this bar 8 itself rests with its lower transverse groove 10 on another bar 8 located beneath it. Since these last two bars (shown only in part in FIG. 5) have transverse grooves 10, the bar 7 extends still farther downward from the bottom of the upper transverse groove 10. Similarly, the bar 8 that carries the bar 7 rests with the bottom of its lower transverse groove 10 in the upper transverse groove of the bar 8 extending crosswise to it, so that this latter bar protrudes farther upward from the aforementioned lower transverse groove. As a result, the two bars 7 and 8 extend in the same direction and touch one another practically over their entire length, which creates a closed wall, as can be seen in FIG. 1. The depth of the transverse grooves 10 must therefore be adapted accordingly, as is discussed below.

As already mentioned, the bars 8 have upper and lower transverse grooves 10, while the ending bars 7, which are only half as high, are provided with transverse grooves 10 only on one long edge. The spacing between the transverse grooves 10 and the ends of the bars is defined by the objects to be received. In the present case, as already noted, part 1 is intended to receive CD-container boxes (cases) A on all four sides, as indicated by dot-dash lines in FIG. 1. Since the diameter of these audio media is standardized, the boxes are of virtually uniform size. Since they are to be held on three sides in the stand, the spacing of any transverse groove 10 from the end of the bar is approximately equivalent to the length of one side of a box A, or somewhat less, so that the boxes protrude slightly. The longitudinal spacing between the two transverse grooves 10 of each bar, and hence the spacing between two parallel walls, is conversely adapted to the width of the boxes A, so that they can be easily slid in. In part 2, which is intended for rectangular audio tape cassettes, the spacing is adapted accordingly. Still other conditions would be necessary for other objects, such as video cassettes.

In assembling part 1 of FIG. 2, the stacking of bars 8 is continued until the desired height is reached. Two ending bars 7 must then be put in place again to equalize the height. Here there are two possible variants. First, as can easily be seen from FIG. 2, one can finally place bars 7 finally on the same rows that have the bars 7 at the very bottom. The other variant is shown in FIG. 1: The assembly of the walls in which the bars 7 are located at the bottom, or in other words where assembly began with those bars, is then continued using only bars 8. As a result, the walls extending transversely to them, of which the face ends are seen in FIG. 1, each receives one bar 7 at the top. The order of bars is accordingly 7-8-8 . . . for one pair of walls, and . . . 8-8-7 for the other pair, so that a uniform height of all four walls will always be attained.

As can be seen, all the bars are disposed such that their longitudinal ribs 9 are oriented toward one another. This creates supports for the objects to be stored, and the objects are then individually inserted horizontally. Instead, however, a single plate can also be inserted, which corresponds precisely to the distance between the parallel walls and rests on the longitudinal ribs 9. On this plate, a group of objects can then be disposed vertically, or some decorative object can for instance be placed on top. In that case, the longitudinal ribs 9 located above this plate are unused.

Naturally more bars than are shown in FIG. 1 can be stacked on one another if needed. The bars can also be produced with more than one longitudinal rib (bars 7) or more than two longitudinal ribs (bars 8). The entire arrangement can suitably be designed and sold as a "kit", with the stand then being assembled by the user. Especially in this connection, it may suitable for two half-height bars 7 each to be permanently joined to a base plate 5 and/or to an ending plate 11 from the very outset.

In FIGS. 3 and 4, bars 8 of full height h and bars 7 of half height h/2 are accordingly provided. The depth of the transverse grooves 10 is always one-fourth the full height, or in other words h/4, so that the interlocking shown in FIG. 5 results at the intersections. On the hand, the vertical spacing a between the longitudinal ribs 9 should be such that the objects A can easily be inserted. Since this spacing must also be maintained between two stacked bars, it follows that the spacing between the longitudinal ribs 9 and the upper and lower edges of the bar must be half as much, that is, a/2. The thickness of the longitudinal ribs 9 may vary depending on the material and mode of production of the bars. The bar height h is the result of the aforementioned rib thickness and the spacing a, as can easily be seen from FIGS. 3 and 4.

Once the receiving part 1 has reached the desired height, a square ending plate 11 as shown in FIG. 6 is placed on top of the center opening formed by the intersecting bars. The plate 11 rests on the topmost longitudinal ribs 9. In the middle, it has a bore 12, and on the top it has an indentation 13 concentric with the bore. A vertical threaded rod 14 coming from the bottom plate 5 and disposed in the center axis leads through both the bore and the indentation. The indentation is used for putting a nut (not shown) on the threaded rod 14, in such a way that by means of the nut and the threaded rod 14 the ending plate 11 is centered, and the stack of bars 7 and 8 of part 1 is held together. The ending plate 11 also has a middle region 15, which is structured in the same way as the middle region 6 of the bottom plate 5.

On the top, the ending plate 11 has four protrusions 16. They fit into indentations in a lid (not shown), which optionally, if only part 1 is present, serves to close off the stand at the top. For that purpose, it should have approximately the same diameter as the base plate 3.

Such a lid is not shown in FIG. 1, which depicts the four protrusions 16 of the ending plate 11 serving as means for centering the bars from which the (upper) part 2 is assembled. This part 2, as already mentioned, is used to receive other objects, such as audio cassettes, that have dimensions different from those of CD boxes. Accordingly, the bars of part 2 also have different dimensions, but otherwise are designed on the same principle as, and are assembled like, the bars 7, 8 of part 1. That is, once again there are, for instance, bars of half height, with only one longitudinal rib and bars of full height, with two longitudinal ribs, each of which have transverse grooves for interlocking the bars.

If part 2 of FIG. 1 is mounted on part 1, then it too has an ending plate 11' of FIG. 7 at the top, which differs from the ending plate 11 of part 1 only in its dimensions. The bore 12 and the indentation 13 are of the same dimensions. The threaded rod 14 must then be correspondingly longer so that it can also center part 2 and hold it together. A lid 17 (FIG. 1) rests on part 2, likewise centered in protrusions of the ending plate 11'; it may be round or square, for instance, and its dimensions are adapted to part 2.

Depending on the intended use and place where the stand will be set up, wood or plastic is a possible material for the stand and for the bars 7, 8. Plastic has the advantage that it can be colored in any desired way, and also that the bars can be extruded as profiles of arbitrary length or can be made by injection molding. Wood bars can also be efficiently worked in great lengths, provided with transverse grooves, and then cut to the desired length. So-called medium density fiberboard (MDF) is possible as the wood material, because it is easy to work and because of its homogeneity. However, the flexural strength of this material is not as great as that of wood or plastic. Profiling, for instance in accordance with FIG. 7, is then recommended (which may also be advantageous for the other materials, as well). Each bar has one or more longitudinal grooves 18, for instance on its underside, and corresponding protruded profiling with one or more tongues 19 on its top; the interengagement of these profiles or "teeth" prevents lateral distortion or deviation of the stacked bars 8 or 7.

The great advantages of the stand described reside in the fact that, except for the base, bottom, and ending plates, its assembly requires only two types of bars. It can therefore be produced as an unassembled, easily transported kit and sold in various sizes; the bars can also be sold individually. Naturally, the stand is suitable not only for the objects mentioned but also for other objects of the same shape as one another, of which there are very many kinds in use.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A stand for holding objects all having a same form and being in sets, the objects of each set having a common size, a common length, and a common height; the stand comprising:

at least one holding part (1, 2) for objects of one of the sets; the one holding part further comprising a plurality of pairs of bar-shaped structural elements (7, 8), the structural elements being of a first type and being disposed around a vertical center axis, the structural elements of each of the pairs being identical in shape, deployed horizontally, and mutually parallel, each of the pairs comprising one level of the one holding part;

adjacent levels including respective pairs in perpendicular arrangement and interlocking with one another;

each of the structural elements including two identical longitudinal ribs (9) on an inner side thereof and two pairs of identical transverse grooves (10) on upper and lower edges thereof;

a groove-to-end length, from a structural element end to a transverse structural element, adopted to be generally equal to the common length of the objects;

a distance between the ribs adopted to be generally equal to the common height of the objects;

the structural elements resting in the transverse grooves of adjacent structural elements of a different level; and the ribs of the structural elements of each pair facing each other to form parallel supports for holding the objects.

2. The stand according to claim 1, including structural elements being of a second type and forming at least one of a bottom level and a top level; wherein, the structural elements of the second type each comprising:

one longitudinal rib on an inner side thereof and one pair of transverse grooves on one of an upper and a lower edge thereof, the edge facing adjacent structural elements; and wherein the structural elements of the second type are half as high as the structural elements of the first type.

3. The stand according to claim 2, wherein the structural elements (7, 8) are disposed on a bottom plate (5) rotatably mounted on a base plate (3) about a rotational connection (4) that is aligned with the center axis (14).

4. The stand according to claim 1, wherein a heightwise spacing a/2 of one longitudinal rib (9) from a closest longitudinal edge of the structural element is one-half of an inter-rib spacing a between two adjoining longitudinal ribs (9) located on a same structural element (8).

5. The stand according to claim 1, wherein the structural elements (7, 8) of a first holding part (1) are held together between a bottom plate (5) and a top ending plate (11) with a vertical connecting device (14).

6. The stand according to claim 5, wherein a second holding part (2), composed of second structural elements of different dimensions, is mounted on the first holding part (1).

7. The stand according to claim 6, wherein the ending plate (11) of the first holding part (1) serves as a centering means for the second holding part (2), and the second holding part is held together between a further ending plate (11') and the first holding part (1).

* * * * *